United States Patent [19]

Gassmann et al.

[11] Patent Number: 4,577,688

[45] Date of Patent: Mar. 25, 1986

[54] INJECTION OF STEAM FOAMING AGENTS INTO PRODUCING WELLS

[75] Inventors: Zean Z. Gassmann; Jeffrey T. Hawkins; Alfred Brown, all of Houston, Tex.

[73] Assignee: Texaco Inc., White Plains, N.Y.

[21] Appl. No.: 638,920

[22] Filed: Aug. 8, 1984

Related U.S. Application Data

[63] Continuation-in-part of Ser. No. 576,694, Feb. 3, 1984, abandoned.

[51] Int. Cl.$^4$ .................. E21B 43/24; E21B 43/30
[52] U.S. Cl. .................. 166/245; 166/263; 166/272; 166/288; 166/294; 166/309
[58] Field of Search .............. 166/245, 263, 272, 303, 166/309, 288, 294; 299/2; 252/8.55 D

[56] References Cited

U.S. PATENT DOCUMENTS

| | | | |
|---|---|---|---|
| 3,366,175 | 1/1968 | Ferrell et al. | 166/273 |
| 3,376,924 | 4/1968 | Felsenthal et al. | 166/263 |
| 3,402,768 | 9/1968 | Felsenthal et al. | 166/263 X |
| 3,410,344 | 12/1968 | Cornelius | 166/303 |
| 3,994,345 | 11/1976 | Needham | 166/303 |
| 4,018,278 | 4/1977 | Shupe | 166/252 |
| 4,086,964 | 5/1978 | Dilgren et al. | 166/272 |
| 4,088,190 | 5/1978 | Fischer et al. | 166/274 |
| 4,113,011 | 9/1978 | Bernard et al. | 166/273 |
| 4,129,182 | 12/1978 | Dabbous | 166/263 |
| 4,166,501 | 9/1979 | Korstad et al. | 166/263 |
| 4,166,502 | 9/1979 | Hall et al. | 166/263 |
| 4,166,503 | 9/1979 | Hall et al. | 166/263 |
| 4,166,504 | 9/1979 | Brown et al. | 166/272 |
| 4,175,618 | 11/1979 | Wu et al. | 166/263 X |
| 4,177,752 | 12/1979 | Brown et al. | 166/263 |
| 4,321,966 | 3/1982 | Traverse et al. | 166/272 X |
| 4,393,937 | 7/1983 | Dilgren et al. | 166/272 |
| 4,445,573 | 5/1984 | McCaleb | 166/272 X |

FOREIGN PATENT DOCUMENTS 2095309  9/1982  United Kingdom.

OTHER PUBLICATIONS

R. L. Eson, SPE Paper No. 11806 "Improvements in Sweep Efficiencies . . .", 1983.
T. M. Doscher et al., "Field Demonstration of Steam Drive . . . 38 , *Journal of Petroleum Technology*, Jul. 1982, pp. 1535–1542.
R. M. Dilgren et al., SPE Paper No. 10774, "Laboratory Development and Field Testing of . . . Foams", 1982.

*Primary Examiner*—George A. Suchfield
*Attorney, Agent, or Firm*—Jack H. Park; Kenneth R. Priem; Harold J. Delhommer

[57] ABSTRACT

The disclosed invention is a method of injecting steam foaming agents in conjunction with steam and usually, a non-condensable gas into production wells producing a substantially high water to oil ratio. The most preferred production wells for foaming agent injection are corner production wells of flooding patterns such as inverted 5- and 9-spots, especially when the flooding pattern contains infill wells between the central injection well and the corner production wells.

Although the method of injecting foaming agent, steam and usually, a non-condensable gas is effective with any foaming agent, the method works particularly well with foaming agents of the general formula:

$$RO(R'O)_nR''SO_3M$$

where R is an alkyl radical, branched or linear, or an alkylaryl radical such as an alkylbenzene, alkyltoluene or alkylxylene group, having from about 8 to about 24 carbon atoms, R' is ethyl, propyl or a mixture of ethyl and propyl, n has an average value of about 1 to about 20, R" is ethyl, propyl, hydroxypropyl or butyl and M is an alkali metal or ammonium ion.

12 Claims, No Drawings

4,577,688

INJECTION OF STEAM FOAMING AGENTS INTO PRODUCING WELLS

BACKGROUND OF THE INVENTION

This application is a continuation-in-part application of U.S. patent application Ser. No. 06/576,694, filed Feb. 3, 1984, now abandoned.

This application is related to concurrently filed, copending U.S. patent applications Ser. No. 638,919, filed Aug. 3, 1984, now U.S. Pat. No. 4,540,050 and Ser. No. 638,918, filed Aug. 8, 1984, now U.S. Pat. No. 4,540,049, both of which are incorporated herein by reference. The present invention relates to the injection of steam foaming agents with steam and usually, a non-condensable gas into producing wells to significantly improve vertical conformance.

When an oil reservoir is subjected to steam injection, steam tends to move up in the formation, whereas condensate and oil tends to move down due to the density difference between the fluids. Gradually, a steam override condition develops, in which the injected steam sweeps the upper portion of the formation but leaves the lower portion untouched. Injected steam will tend to follow the path of least resistance from the injection well to a production well. Thus, areas of high permeability will receive more and more of the injected steam which further raises the permeability of such areas. This phenomenon exists to an even larger degree with low injection rates and thick formations. The steam override problem worsens at greater radial distances from the injection well because steam flux decreases with increasing steam zone radius.

Although residual oil saturation in the steam swept region can be as low as 10%, the average residual oil saturation in the formation remains much higher due to poor vertical conformance. Thus it is because of the creation of steam override zones that vertical conformance in steam floods is usually poor.

One method of recovering more oil despite the existence of steam override zones is to drill infill wells between production and injection wells. Methods for using infill wells are disclosed in U.S. Pat. Nos. 4,166,501; 4,166,502; 4,166,503; 4,166,504 and 4,177,752.

It has long been the concern of the oil industry to improve the vertical conformance of a steam flood by reducing the permeability of the steam swept zone. The injection of numerous chemicals such as foams, foaming solutions, gelling solutions or plugging or precipitating solutions have been tried. Because of the danger of damaging the reservoir, it is considered important to have a non-permanent means of lowering permeability in the steam override zones. For this reason, certain plugging agents are not deemed acceptable. In order to successfully divert steam and improve vertical conformance, the injected chemical should be (1) stable at high steam temperatures of about 300° to about 600° F., (2) effective in reducing permeability in steam swept zones, (3) non-damaging to the oil reservoir and (4) economical.

The literature is replete with references to various foaming agents which are employed to lower permeability in steam swept zones. The foaming agents of the prior art require the injection of a non-condensable gas to generate the foam in conjunction with the injection of steam and the foaming agent. U.S. Pat. Nos. 3,366,175 and 3,376,924 disclose the injection of a steam foam in a hydrocarbon reservoir at the interface between the hydrocarbons and the gas cap to aid in recovery. U.S. Pat. Nos. 3,410,344 and 3,994,345 disclose the use of a steam foaming agent selected from the generic groups of polyethoxyalkanols and alkylaryl sulfonates to reduce permeability in steam channels. The use of similar surfactants such as sodium lauryl sulfoacetate and alkyl polyethylene oxide sulfate are disclosed as foaming agents in carbon dioxide foams in U.S. Pat. Nos. 4,088,190 and 4,113,011, respectively. U.S. Pat. No. 4,018,278 discloses the use of sulfonated, ethoxylated alcohols or alkylphenols in surfactant flooding solutions without the use of steam.

Several trademarked foaming agents have been field tested by petroleum companies in steam floods. These include such trademarked chemicals as Stepanflo 30 sold by Stepan Chemical Co., Suntech IV sold by Sun Oil, Thermophoam BWD sold by Farbest Co. and COR-180 sold by Chemical Oil Recovery Co. U.S. Pat. No. 4,086,964 discloses the use of lignin sulfonates for a foaming agent and 4,393,937 discloses the use of alpha olefin sulfonates as a steam foaming agent. See also United Kingdom Pat. No. 2,095,309 for a disclosure of alpha olefin sulfonate foaming agents.

Disclosures of laboratory and field tests of Stepanflo are contained in SPE Paper No. 10774 entitled "The Laboratory Development and Field Testing of Steam/-Noncondensible Gas Foams for Mobility control in Heavy Oil Recovery" by Richard E. Dilgren et al. presented at the 1982 Califorina Regional Meeting of the SPE held in San Francisco on Mar. 25-26, 1982 and the Journal of Petroleum Technology, July 1982, page 1535 et seq. The same Journal of Petroleum Technology also discusses tests conducted on Thermophoam BWD. Additional information on tests of Thermophoam BWD are also disclosed in Department of Energy Publications DOE/SF-10761-1, -2 and -3.

Tests of the COR-180 foaming agent of Chemical Oil Recovery Co. are disclosed in SPE Paper No. 11806 entitled "Improvement in Sweep Efficiencies in Thermal Oil-Recovery Projects Through The Application of In-Situ Foams" by R. L. Eson, presented at the International Symposium on Oil Field and Geothermal Chemistry in Denver, June 1-3, 1983 and Department of Energy Reports Nos. DOE/SF/10762-1, -2 and -3.

SUMMARY OF THE INVENTION

The present invention pertains to the injection of steam foaming agents in conjunction with steam and usually, a non-condensable gas into production wells producing a substantially high water to oil ratio. The steam foaming agents decrease permeability in steam swept zones and increase oil recovery, diverting steam into unswept areas of the formation between the former production wells now being used for injection and previous injection wells. The most preferred production wells for foaming agent injection are corner production wells from flooding patterns such as inverted 5- and 9-spots.

There are three preferred methods of converting producing wells into injection wells and injecting the foaming agent and steam. The first is to perforate the well in the bottom third of the hydrocarbon zone and inject foaming agent and steam through those perforations. The second preferred method is to perforate in the top and bottom third of the pay zone and set a packer in the casing between the two perforated areas. Steam is then injected through the bottom perforations and foaming agent and steam is injected into the top of the pay zone. The third preferred method is similar to the second method in that steam and foaming agent is injected into the top of the pay zone and different in that the well is produced through the bottom perforations. Injection from the central injector or infill well is continued.

Although the invention method of injecting foaming agent and steam into production wells is effective with any foaming agent, the method works particularly well with foaming agents of the general formula:

$$RO(R'O)_nR''SO_3^-M^+,$$

where R is an alkyl radical, branched or linear or an alkylaryl radical such as an alkylbenzene, alkyltoluene or alkylxylene group, having from about 8 to about 24 carbon atoms in the alkyl chain, R' is ethyl, propyl or a mixture of ethyl and propyl, n has an average value of about 1 to about 20, R" is ethyl, propyl, hydroxypropyl or butyl and M is an alkali metal or ammonium ion.

DETAILED DESCRIPTION

When injected with steam and a non-condensable gas, steam foaming agents can be highly effective in reducing the permeability of steam swept zones. The steam swept zones may be steam override zones or high permeability channels at any location or depth in the pay zone. Foaming agents generally have an affinity for formation areas of high permeability and low oil saturation. Thus, when injected with steam, foaming agents can substantially reduce the permeability of the steam swept zones and force injected steam into other, unswept areas of the formation.

The present invention concerns the novel method of injecting steam foaming agents in conjunction with steam and usually, a non-condensable gas into a producing well to improve vertical conformance. This method improves vertical conformance and increases oil recovery to a significantly greater degree than the injection of the same steam foaming agent through the same well channeled injection pathways in the formation.

It may be desirable to delay the injection of steam foaming agent and steam into the producing well until the production from the producing well reaches at least an 80% water to oil ratio. An 80% or higher water cut is indicative of a steam override zone. Once the water cut passes 80%, the production well may quickly reach its economic production limit. However, the steam foaming agent and steam may increase production efficiency if injected into a producing well long before the steam override zone is created and indeed, may prevent or at least postpone the creation of a steam override zone.

The three preferred methods of injecting steam foaming agent and steam into a production well involves perforating the former producing well in the bottom one-third, preferably the bottom one-fourth of the hydrocarbon producing zone. The first method calls for injecting a foaming agent, steam and non-condensable gas through the bottom perforations.

The second and third methods call for perforating the former producing well in the top and bottom one-third, preferably one-fourth of the hydrocarbon producing zone and setting a packer between the two perforated areas. In the second method, the steam foaming agent and steam is injected into the annulus and through the perforations in the top portion of the formation and steam alone is injected through the tubing into the bottom portion of the formation. The injection of steam, foaming agent and non-condensable gas into the annulus in the top one-fourth to one-third of the formation effectively decreases the flow of steam in the override zone in the top portion of the formation. Steam only is then injected down the tubing into the bottom portion of the formation to produce the oil that the steam previously passed by. The steam does not substantially override due to the cap created by the in situ foam block and thus, sweeps most of the previously bypassed oil to production wells.

In the third method, steam foaming agent, steam and usually, non-condensable gas is injected into the top perforations while the same well is produced from the bottom perforations. This method also requires the injection of a fluid, preferably water or steam into a nearby injection well such as a central injection well or an infill well.

The most preferred production wells for injecting foaming agent and steam are corner wells in various flooding patterns. Injection into the corner wells of the popular flooding patterns of an inverted five-spot and an inverted nine-spot are the most preferred. Of course, not all corner wells in such inverted drilling patterns should be converted to injection wells as this would leave zero production wells, unless the pattern contained infill wells completed as production wells. In some circumstances, it may be desirable to convert the central injection well to a production well after converting one or more corner wells to injection wells as per this invention.

Infill production wells in large flooding patterns also provide favorable candidates for the injection of foaming agent to increase oil recovery conformance. Infill wells are preferably drilled into the recovery zone of the formation between injection and production wells with fluid communication between the infill well and the formation established in only the lower 50%, and preferably the lower third or lower 25% of the formation.

Flooding with infill wells is preferably conducted by injecting steam into an injection well and producing at a production well until steam breakthrough at the production wells occur. At that time, as little as 50% or less of the formation will have been swept by steam due to steam channeling through the upper portions of the formation. After steam breakthrough at a production well, production is then taken from an infill well which recovers more oil from the lower portion of the formation between the primary injection well and the infill well. Steam injection is continued through the original injection well and production is also continued from the original production well. These steps are usually followed until the produced fluid at the infill well reaches at least a 90% water cut, preferably a 95% water cut. At this time, the infill well may be converted to an injection well by injecting steam into the infill well and producing at other wells.

In the practice of the present invention, a steam foaming agent may be injected into the infill well along with the injection of steam and usually a non-condensable gas. The foaming agent will lower the permeability of the steam swept areas diverting steam into bypassed portions of the formation.

The present invention is especially effective in a large flooding pattern such as an inverted five-spot or inverted nine-spot penetrated by infill wells. Several options of the inventive method are available. Either the infill well or a corner production well may be converted to an injection well. There is generally no advantage to converting both adjacent corner and infill wells to injection wells.

If the infill well is converted to an injection well, the adjacent corner production well is not converted. Steam, a steam foaming agent and usually, a non-condensable gas are injected into the formation through the infill well and production is taken at the nearby corner well as well as other production wells. It is preferred to convert the infill well according to one of the three preferred injection methods previously described. It is preferred that fluid injection, preferably water or steam, continue at the central injection well to prevent injected fluid from flowing from the infill well to the central injection well.

Alternately, a corner production well can be converted to an injection well, preferably according to one of the three preferred injection methods previously described. Steam, a steam foaming agent and usually, a non-condensable gas is injected through the former corner production well and production is taken at the infill well as well as other nearby production wells. Preferably, fluid injection will also continue at the central injection well to help prevent production from flowing past the infill well.

Although the invention method of injecting foaming agent and steam into production wells is effective with any foaming agent, the method works particularly well with the steam foaming agents represented by the general chemical formula:

RO(R'O)$_n$R''SO$_3^-$M$^+$, where R is an alkyl radical, branched or linear, or an alkylbenzene, alkyltoluene or alkylxylene group, having from about 8 to about 24 carbon atoms, preferably about 12 to about 20 carbon atoms in the alkyl chain, R' is ethyl, propyl or a mixture of ethyl and propyl, preferably ethyl, n has an average value of about 1 to about 20, preferably about 2 to about 5, R'' is ethyl, propyl, hydroxypropyl or butyl and M is an alkali metal or ammonium cation. The preferred alkali metal ions are sodium, lithium and potassium. It should be noted that n is an average value and that the invention compounds will normally have varying degrees of ethoxylation.

Certain steam foaming agents work effectively without the injection of a non-condensable gas. Some of these agents are represented by the general formula:

RO(R'O)$_n$R''SO$_3^-$M$^+$, where R is an alkyl radical, linear or branched, having from about 15 to about 21 carbon atoms in the alkyl chain, R' is ethyl or propyl, preferably ethyl, n has an average value of about 2 to about 5, preferably about 3 to about 4, R'' is ethyl, propyl, hydroxypropyl or butyl and M is an alkali metal or ammonium cation. The preferred alkali metal cations are sodium, lithium and potassium. It should be noted that n is an average value and that the compounds will normally have varying degrees of ethoxylation.

The foaming agents which do not require the use of a non-condensable gas offer substantial economic advantages over other steam foaming agents which require the injection of significant quantities of a non-condensable gas. Their cost of manufacture compares very favorably with the cost of existing foaming agents which additionally require the use of expensive quantities of a non-condensable gas.

These foaming agents are chemically stable at the high temperatures encountered in steam floods (300° to 600° F.). The treatment is not permanent in that the agents are eventually produced. The reservoir remains undamaged.

The five most preferred foaming agents are herein labeled Agents 2, 3, 4, 5 and 6 which correspond to the example numbers. Agents 2, 3 and 4 work very effectively without the injection of a non-condensable gas. Although the preferred agents illustrated below have linear saturated alkyl radicals for the R substituent, it should be noted that the saturated alkyl radical may also be branched. The chemical formulas of the most preferred foaming agents are:

Agent 2
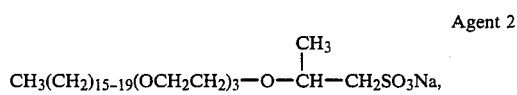

Agent 3
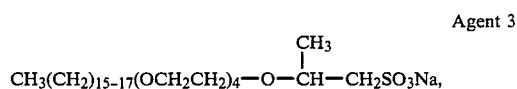

Agent 4
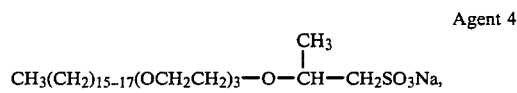

Agent 5
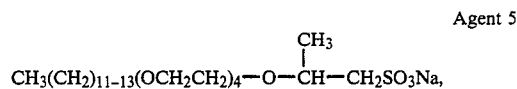

Agent 6
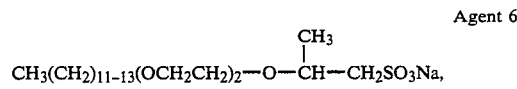

Agent 7
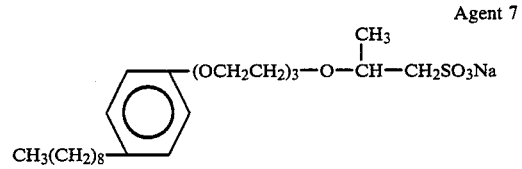

Agent 8
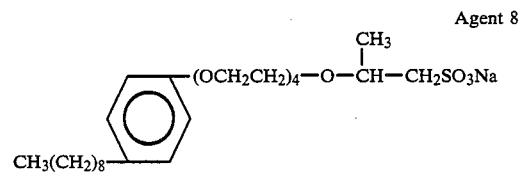

Other foaming may also be used in the practice of the invention. Some well known foaming agents which are suitable include olefin sulfonates, alkylaryl sulfonates, polyethoxy alkanols and oxyethylene sulfates.

The mixture of steam, non-condensable gas and foaming agent can bring about a substantial reduction in permeability when injected into the high permeability areas of the formation at almost any time. Vertical conformance will be significantly improved whether the steam foaming agent and gas are injected into the formation at the very beginning of steam injection through the former production well or whether injection of the foaming agent is delayed substantially after the injection of steam into the former production well. But the most preferred injection time is at the beginning of steam injection into the former production well. The injection of the foaming agent with initial steam injection at the former production well will postpone the time of steam breakthrough and spread the steam over a larger volume of the reservoir near the former production wells.

The foaming agents will also work quite well if steam breakthrough occurred in the past at the production wells and low oil saturation steam override zones exist. But in such a situation, the foaming agent must be injected through the former production well or wells in larger concentrations and greater quantities to reduce permeability in a frequently swept area. Generally, the mixture of steam, gas and foaming agent must be injected into the reservoir at a higher pressure than the previous injection of steam because additional volume is being injected into the formation and the foaming agent is simultaneously reducing permeability. However, the injection pressure must be less than the reservoir fracturing pressure or damage to the formation will occur.

The foaming agent and gas may be injected into the formation without the concurrent injection of steam, provided that steam is injected into the formation prior to and after the injection of the foaming agent and gas. But preferably, the steam is coinjected with the foaming agent and gas.

The foaming agent, non-condensable gas and steam should be injected in a mixture such that the foaming agent comprises about 0.01% to about 5% preferably about 0.02% to about 1.5% by weight of the steam (cold water equivalent). The foaming mixture contains about 0.01 to about 5, preferably about 0.01 to about 1.5 thousand standard cubic feet of a non-condensable gas per barrel of steam. It is contemplated that the injected steam range from about 20% to about 90% quality. A higher concentration of foaming agent is generally necessary if the region has been swept by steam for a considerable time. But individual tests should be run to tailor the concentration of the foaming agent in steam as the increased effectiveness of the foaming agent per increased concentration of foaming agent quickly reaches a point of diminishing returns. Furthermore, other surfactants may also be included in the steam and foaming agent mixture to increase oil recovery providing they do not substantially inhibit the foam.

In general, the non-condensable gas used in the foam mixture of the present invention can comprise substantially any gas which (a) undergoes little or no condensation at the temperatures and pressures at which the foam mixture is subjected and (b) is substantially inert to and compatible with the foaming agent and other components of that mixture. Such a gas is preferably nitrogen but can comprise other gases such as air, carbon dioxide, ethane, methane, flue gas, or the like.

Two conditions will be prevalent in a steam override zone, especially in a well developed override zone. The steam flux in the override zone will be high relative to other portions of the reservoir because the steam will be chiefly passing through the override zone. In addition, the residual oil saturation in the override zone will be relatively low due to continuous steam flooding.

Desirable attributes of a good steam foaming agent are that the agent would work best in a low oil saturation area and at a higher steam flux. The foaming agents named herein offer these substantial advantages with their affinity for the areas of low oil saturation and high steam flux, as is indicated in the Examples, particularly Examples 26-29.

No chemical or physical deterioration has been detected in the foaming agents used in the reservoir at steam injection temperatures. Additionally, no problems have been encountered with thermal or hydrolytic stability of the agents. The foams tested have continued to be effective up to three days but since the foaming agent will be eventually produced, it is generally necessary to continue injecting foam into the high permeability areas. Cooling problems also fail to affect foam stability. This is because the foam will go preferentially into the high permeability areas of the steam override which are very hot. The cool areas of the formation are those areas of low permeability which the foam will avoid.

The following examples will further illustrate the use of steam foaming agents which may be employed in the method of the present invention. These examples are given by way of illustration and not as limitations on the scope of the invention. Thus, it should be understood that the composition and concentration of the foaming agents may be varied to achieve similar results within the scope of the invention.

EXAMPLES 1-13

Multiple runs were made in a foam testing apparatus to determine the effectiveness of the foaming agents of the present invention and several well known steam foaming agents when injected with steam in the absence of a non-condensable gas. A 90 cm linear cell with an inside diameter of 3.4 cm was packed with sand, oil and water to a porosity of 0.4 and an oil saturation of 0.2. The sand pack was steam flooded at 4 ml per minute of cold water equivalent until no more oil was produced. The pressure drop across the cell length with the steam injection only was measured and determined to be approximately 10 psig in Example 1. A high concentration of 6% active foaming agent (corresponding to about a 1% in situ concentration in the aqueous phase in the cell) was then injected with steam at approximately 0.5 ml per minute. The pressure drop was recorded continuously. When the pressure drop stabilized, nitrogen was injected at 8.4 ml/min. The nitrogen injection rate was then increased to higher levels when the pressure drop restabilized.

Examples 2, 3 and 4 show pressure drops across the cell of some 11 to 18 times the pressure drop experienced with injection of steam alone without the injection of a non-condensable gas such as nitrogen. The effectiveness of these three foaming agents, Agents 2, 3 and 4 increased even more with the injection of 8.4 and 16.8 ml/min of nitrogen. Along with the foaming agents of Examples 5 and 6, Agents 5 and 6, these foaming agents were more than twice as effective as the other well known agents tested. Another foaming agent of the present invention, Agent 7 of Example 7 performed as well as the tested prior art foaming agents.

TABLE I

| Ex. | Foaming Agent | Pressure Drop Across Cell (psig) at N$_2$ Flow Rates Of | | | |
| --- | --- | --- | --- | --- | --- |
| | | 0 ml/min | 8.4 ml/min | 16.8 ml/min | 25.2 ml/min |
| 1 | Steam Only | 10 | | | |
| 2 | Agent 2 | 120 | 312 | 355 | |
| 3 | Agent 3 | 185 | 250 | 360 | |
| 4 | Agent 4 | 110 | | | |
| 5 | Agent 5 | 10 | 260 | 280 | |
| 6 | Agent 6 | | 295 | | |
| 7 | Agent 7 | | 129 | | |

TABLE I-continued

| Ex. | Foaming Agent | Pressure Drop Across Cell (psig) at $N_2$ Flow Rates Of | | | |
|---|---|---|---|---|---|
| | | 0 ml/min | 8.4 ml/min | 16.8 ml/min | 25.2 ml/min |
| 8 | Agent 8 | 10 | 15 | 16 | 126 |
| 9 | Stepanflo 30 | 10 | 25 | 25 | 40 |
| 10 | Stepanflo 1390 | 10 | 134 | 178 | |
| 11 | Thermophoam BWD | 10 | 64 | 69 | 144 |
| 12 | Bioterge AS-40 | 10 | 130 | | |
| 13 | Suntech IV | 10 | 141 | 139 | 143 |

Stepanflo 30 and 1390 - trademarked alpha olefin sulfonates sold by Stepan Chemical Co.
Thermophoam BWD - a trademarked alpha olefin sulfonate sold by Farbest Co.
Bioterge AS-40 - a trademarked alpha olefin sulfonate sold by Stepan Chemical Co.
Suntech IV - a trademarked sulfonate sold by Sun Oil Co.

To determine a lower limit on the nitrogen flow rate, it was felt that a minimum increase in pressure drop over the cell to assure effective operation would be about ten times the pressure drop with injection of steam only. Hence, the lower limit of nitrogen flow is the flow rate that would cause the minimum desired 100 psig pressure drop across the cell. The results of Table I were linearly interpolated to obtain the nitrogen flow rate that would yield a 100 psig pressure drop with a 6% (corresponding to about a 1% in situ concentration) injection of foaming agent. It should be noted that these are only rough estimates and that the behavior of these foaming agents is not entirely linear.

TABLE II

| Example | Foaming Agent | Lower Limit $N_2$ Flow Rate | |
|---|---|---|---|
| | | ml/min | MSCF/bbl Steam |
| 2 | Agent 2 | 0 | 0 |
| 3 | Agent 3 | 0 | 0 |
| 5 | Agent 5 | 3.0 | 0.18 |
| 8 | Agent 8 | 23.2 | 1.38 |
| 9 | Stepanflo 30 | 40.0 | 2.38 |
| 10 | Stepanflo 1390 | 6.1 | 0.36 |
| 11 | Thermophoam BWD | 20.3 | 1.21 |
| 12 | Bioterge AS-40 | 6.3 | 0.37 |
| 13 | Suntech IV | 5.8 | 0.35 |

EXAMPLES 14–21

Further experiments were conducted with the foam testing apparatus to transform the pressure drop figures into more readily identifiable numbers of percent oil recovery. The procedure of Examples 1–13 was followed and the foam mixture was injected with 6% (corresponding to about a 1% in situ concentration) foaming agent and 16.8 ml/min of nitrogen. The three agents of the present invention that were tested in Examples 19–21 offered commanding oil recovery efficiency advantages over the foaming agents of the prior art.

TABLE III

| Example | Foaming Agent | Δp (psig) | % Oil Recovery |
|---|---|---|---|
| 14 | Thermophoam BWD | 69 | 28.3 |
| 15 | Siponate 301-10 | 32 | 31.0 |
| 16 | Stepanflo 20 | 19 | 40.2 |
| 17 | Igepal CA 720 | 11 | 4.1 |
| 18 | COR-180 | 12 | 24.3 |
| 19 | Agent 4 | 280 | 83.7 |
| 20 | Agent 3 | 360 | 76.3 |

TABLE III-continued

| Example | Foaming Agent | Δp (psig) | % Oil Recovery |
|---|---|---|---|
| 21 | Agent 2 | 335 | 56.7 |

Siponate 301-10 - a trademarked alpha olefin sulfonate sold by Alcolac Co.
Stepanflo 20 - a trademarked alpha olefin sulfonate sold by Stepan Chemical Co.
Igepal CA 720 - a trademarked alkyl phenoxy polyoxy-ethylene ethanol sold by GAF Corp.
COR-180 - trademarked oxyethylene sulfates sold by Chemical Oil Recovery Co.

EXAMPLES 22–25

To determine the minimum effective chemical concentration, additional tests were performed with varying concentrations of foaming Agent 3. Table IV shows the results of these tests. Assuming a minimum 100 psi pressure drop, Table IV can be interpolated to yield a minimum Agent 3 concentration of about 0.26% barrel of chemical per barrel of steam. It should be noted that no substantial improvements in foam efficiency were noted with Agent 3 concentrations over about 0.4% per barrel of steam.

TABLE IV

| Ex. | Foaming Agent Concentration, %+ | | Average Δp | |
|---|---|---|---|---|
| | In Cell | (Injected) | kPa | (psi) |
| 22 | 1.2* | (6) | 1076 | (156) |
| 23 | 0.6 | (3) | 1048 | (152) |
| 24 | 0.4 | (2) | 1034 | (150) |
| 25 | 0.2 | (1) | 552 | (80) |

*Assume average steam quality 0.50.
+bbl of 100% active foaming agent per bbl steam.

For comparison purposes, Table V has been compiled to present the foaming agent concentration and nitrogen amounts used in recent field tests of foaming agents.

TABLE V

| Foaming Agent | Field | bbl Agent bbl Steam | MSCF $N_2$ bbl Steam |
|---|---|---|---|
| Suntech IV | Kern River | 0.714% | 0.078 |
| COR-180 | Witmer B2-3 | 0.104% | 0 |
| Thermophoam BWD | San Ardo | 0.090% | 0.06 |
| Thermophoam BWD | Midway-Sunset | 0.060% | 0.014 |
| Stepanflo 30 | Kern-River Mecca | 0.500% | 0.0207 |

It is apparent that these field tests were conducted with extemely low concentrations of foaming agent and relatively small quantities of injected nitrogen per barrel of steam. Although it is probable that larger quantities of foaming agent and nitrogen could have been more effective, the economics of field tests, even on a small scale, require the use of the smallest quantities practicable. The economics become even more critical for large, field-wide applications.

It should be remembered that the foaming agents of the present invention performed substantially better than the agents of the prior art at higher concentrations in laboratory tests. These novel foaming agents would probably be employed at concentrations similar to those of Table V in field tests.

EXAMPLES 26–29

Examples 26 and 27 were run in a cell two meters in length with an inside diameter of 11.4 cm. The cell was packed with sand and water to a porosity of 0.4 and an oil saturation of 0. The sandpack was steam flooded to bring the cell up to steam temperature at a steam flux of 0.096 ft/min. A solution of 6% of Agent 3 was injected at 0.1 ml/min until a steady-state was reached. The injection of Agent 3 was continued with the injection of 4.2 ml/min. of nitrogen and a steady-state pressure drop of 14.0 psig was measured across the cell length. The steam flux rate was then increased to 0.192 ft/min. which gave a pressure differential of 150 psig over the length of the cell, indicating that the foam offered little resistance to a low steam flow rate, but offered substantial resistance to a high steam flux.

| Ex. 26 | 0.096 ft/min. steam flux gave Δp of 14.0 psig. |
| Ex. 27 | 0.192 ft/min. steam flux gave Δp of 150 psig. |

Examples 28 and 29 were run in the 90 cm sandpack of Examples 1–13 with a porosity of 0.4. Two runs were made with a steam flux of 1.8 ft/min., 6% of foaming Agent 3 with a flow rate of 0.5 ml/min. and a nitrogen injection rate of 8.4 ml/min. The cell of Example 28 had an initial oil saturation of 20% and an average oil saturation of 15% when steady-state was reached with a Δp of 250 psig. The second cell of Example 29 contained no oil and had a Δp of 390 psig during flooding.

| Ex. 28 | $S_o$ of 15% had a Δp of 250 psig. |
| Ex. 29 | $S_o$ of 0% had a Δp of 390 psig. |

From the above examples, it can be seen that the novel foaming agents of the present invention offer substantially increased resistance under the conditions of relatively higher steam flow rates and lower oil saturation that exist in steam override zones.

EXAMPLES 30–32

Tests were also conducted in a dual pack apparatus prepared as per Examples 1–13, wherein two 90 cm linear sandpacks were connected in parallel so that the mixture of steam and foaming agent would have an equal opportunity to travel into and through each of the two sandpacks. One of the cells was a high oil saturation pack having an oil saturation of approximately 35% and the second cell was a low oil saturation sandpack having an oil saturation of about 20% to simulate a steam override zone.

When steam was injected, the vast majority of steam passed through the low oil saturation pack having higher permeability. But as indicated in Table VI, when the steam was injected with the foaming agent Agent 2 at a concentration of about 6%; most of the injected steam went through the low permeability high oil saturation sandpack.

TABLE VI

| Example | | % Of Injected Steam Through Each Cell | |
|---|---|---|---|
| | | Low Oil Saturation | High Oil Saturation |
| 30 | Steam Injection Only | 71.7% | 28.3% |
| 31 | Steam and Agent 2 | 41.5% | 58.5% |
| 32 | Steam and Agent 3 | 15.4% | 84.6% |

Many other variations and modifications may be made in the concepts described above by those skilled in the art without departing from the concepts of the present invention. Accordingly, it should be clearly understood that the concepts disclosed in the description are illustrative only and are not intended as limitations on the scope of the invention.

What is claimed is:

1. A process for recovering hydrocarbons from an underground hydrocarbon formation penetrated by at least one injection well and at least one production well, which comprises:
   injecting steam into a production well;
   injecting into said production well; a mixture of steam, about 0.01 to about 1.5 thousand standard cubic feet of nitrogen and about 0.02% to about 1.5% by weight of a steam foaming agent, based upon the weight of steam in the injected mixture, said foaming agent represented by the formula,

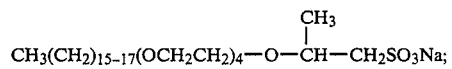

injecting steam into said production well; and
   recovering hydrocarbons and other fluids from a nearby well.

2. The process of claim 1 for recovering hydrocarbons, further comprising:
   injecting fluid into a central injection well;
   recovering hydrocarbons and other fluids at an infill well drilled into the formation between said production well and said central injection well; and wherein said production well is a corner well of an inverted five-spot or an inverted nine-spot pattern.

3. A process for recovering hydrocarbons from an underground hydrocarbon formation penetrated by at least one injection well and at least one production well, which comprises:
   injecting into a production well a mixture of steam and about 0.01% to about 5% by weight of a foaming agent, based upon the weight of steam in the injected mixture,
   said foaming agent represented by the formula,

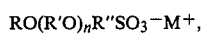

where R is an alkyl radical, branched or linear, having from about 15 to about 21 carbon atoms in the alkyl chain, R′ is ethyl or propyl, n has an average value of about 2 to about 5, R″ is ethyl, propyl, hydroxypropyl or butyl, and M+ is an alkali metal or ammonium ion;
   injecting steam into said production well; and
   recovering hydrocarbons and other fluids from a nearby well.

4. The process of claim 3 for recovering hydrocarbons, further comprising the step of injecting steam into said production well prior to injection of said mixture.

5. The process of claim 3 for recovering hydrocarbons, wherein said production well is an infill well drilled into the formation between an injection well and a producing well.

6. The process of claim 3 for recovering hydrocarbons, wherein said production well is a corner well of a drilling pattern selected from the group consisting of an inverted five spot pattern and an inverted nine spot pattern.

7. A process for recovering hydrocarbons from an underground formation penetrated by at least one injection well, at least one corner production well and at least one infill well, which comprises:
   injecting steam into a corner production well;

injecting into said corner production well a mixture of steam and about 0.02% to about 1.5% by weight of a foaming agent, based upon the weight of steam in the injected mixture,
said foaming agent represented by the formula,

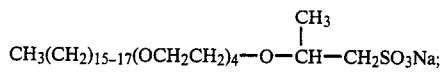

injecting steam into said corner production well; and producing steam and hydrocarbons at an infill well.

8. A process for recovering hydrocarbons from an underground hydrocarbon formation penetrated by at least one injection well and at least one production well, which comprises:
injecting into an infill production well drilled into the formation between a central injection well and a production well a mixture of steam, about 0.01 thousand standard cubic feet to about 5 thousand standard cubic feet of a non-condensable gas and about 0.01% to about 5% by weight of a steam foaming agent based upon the weight of steam in the injected mixture;
converting the central injection well to a production well;
injecting steam into said infill production well; and
recovering hydrocarbons and other fluids from one or more nearby wells.

9. A process for recovering hydrocarbons from an undergound hydrocarbon formation penetrated by at least one injection well and at least one production well, which comprises:
injecting into a production well a mixture of steam, about 0.01 thousand standard cubic feet to about 5 thousand standard cubic feet of a non-condensable gas and about 0.01% to about 5% by weight of a steam foaming agent based upon the weight of steam in the injected mixture;

injecting steam into said production well; and
recovering hydrocarbons and other fluids from a nearby well;
said foaming agent represented by the formula, $$RO(R'O)_nR''SO_3^-M^+,$$

where R is an alkyl radical, branched or linear, or an alkylbenzene, alkyltoluene or alkylxylene group, having from about 8 to about 24 carbon atoms in the alkyl chain, R' is ethyl, propyl or a mixture of ethyl and propyl, n has an average value of about 1 to about 20, R" is ethyl, propyl, hydroxypropyl or butyl, and M+ is an alkali metal or ammomium ion.

10. The process of claim 9 for recovering hydrocarbons, wherein said foaming agent is represented by the formula,

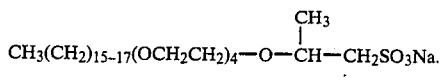

11. The process of claim 9 for recovering hydrocarbons, wherein said foaming agent represented by the formula,

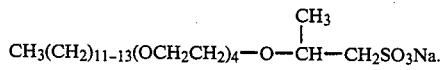

12. The process of claim 9 for recovering hydrocarbons, wherein said foaming agent is represented by the formula,

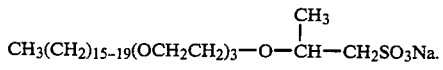

* * * * *